United States Patent Office 2,802,867
Patented Aug. 13, 1957

2,802,867

METHOD OF REFINING NAPHTHENIC ACIDS

Samuel E. Jolly, Ridley Park, Pa., assignor to Sun Oil Company, Philadelphia, Pa., a corporation of New Jersey No Drawing. Application August 23, 1955,
Serial No. 530,204

11 Claims. (Cl. 260—514)

This invention relates to the treatment of naphthenic acids to improve the properties thereof. In particular, the invention relates to improving naphthenic acid color stability.

Naphthenic acids are recovered from mineral oil in accordance with procedures known to those skilled in the art of petroleum refining. Naphthenic acids as usually recovered from petroleum are dark in color. Light colored naphthenic acid fractions can be obtained by vacuum distillation; however, on standing for a short time the light colored fractions rapidly turn dark in color. Elevated temperature and exposure to air accelerate darkening of the naphthenic acid fractions. A stable, light color is an important and desirable property of naphthenic acids in many applications.

In accordance with the present invention, the color stability of naphthenic acids is improved by contacting the naphthenic acids with a halogen-substituted hydrocarbon at reactive conditions, and separating stable, light colored naphthenic acid from products formed during this reactive contact. It has been found that halogen-substituted hydrocarbons, e. g. carbon tetrachloride, react with naphthenic acid constituents to form resinous material of higher boiling range than the naphthenic acids. This resinous material is separated by physical means, e. g. by vacuum distillation, from refined naphthenic acids of improved color stability.

The exact nature of the reaction involved in practice of the present invention is not at this time known with certainty. Nor for that matter are the causes of naphthenic acid color instability definitely known. It is theorized that in practice of this invention color unstable naphthenic acid components, which normally cannot be separated from the naphthenic acids, react with the halogen-substituted hydrocarbon to form higher molecular weight reaction products. During the reactive contact naphthenic acid components are dehydrogenated as evidenced by the evolution of hydrogen halide, e. g. HCl where carbon tetrachloride is used. It is possible that naphthenic acid compounds, which impart color instability to the naphthenic acids, are dehydrogenated and subsequently undergo a condensation or polymerization reaction to form products of higher boiling range.

It is preferred to use carbon tetrachloride in carrying out the invention because of its cheapness and availability. However, other halogen-substituted aliphatic, naphthenic, or aromatic hydrocarbons can be used. It is preferred to use normally liquid halogen-substituted hydrocarbons which boil substantially below the naphthenic acids, e. g. 50° F. or more below the naphthenic acids, so that separation of unreacted halogen-substituted hydrocarbon from treated naphthenic acids is facilitated. The halogen-substituted hydrocarbons are not necessarily equally effective in practice of the invention. Specific examples of halogen-substituted hydrocarbons which can be used in the present invention are carbon tetrachloride, dichloromethane, dibromomethane, chloroform, ethylene dichloride, ethylene dibromide, n-chloropropane, iso-chloropropane, n-bromopropane, iso-bromopropane, n-iodopropane, iso-iodopropane, chlorobenzene, fluorobenzene, fluorotrichloroethane, and the like.

The naphthenic acids and halogen-substituted hydrocarbon are contacted at elevated temperature, i. e. at temperatures in the range of about 250° F. to 550° F. and preferably at 350° F. to 450° F. At these temperatures the halogen-substituted hydrocarbon reacts with naphthenic acid components which promote color instability. A product of the reactive contact is gaseous hydrogen halide. The hydrogen halide should be removed from the reaction mixture as it is formed, and for this reason the reactive contact is conducted at pressures such that the hydrogen halide is normally a gas and does not dissolve in excessive quantities in the reaction mixture. Atmospheric or subatmospheric pressures are preferred. Superatmospheric pressures can on occasion be used.

Generally the use of minor amounts of the halogen-substituted hydrocarbon is sufficient to suitably stabilize the naphthenic acid color. Amounts of the halogen-substituted hydrocarbon of 5% to 25% by weight of the naphthenic acids give good results. However, amounts outside this range can be used. It is preferred that the naphthenic acids treated are first substantially completely deoiled or at least that the oil content of the naphthenic acids is reduced to below about 15% by weight. The deoiled acids generally can be treated with less halogen-substituted hydrocarbon while producing color stable product naphthenic acid fractions. Crude naphthenic acids which are not deoiled can be treated according to the present invention. These acids require treatment with relatively larger amounts of halogen-substituted hydrocarbon to produce stable acids.

The halogen-substituted hydrocarbon can be added in one or several increments. Where the amount of halogen-substituted hydrocarbon is 10% or more of the naphthenic acids, it is preferred to add it in several increments, e. g. in 5% increments. In this way, the reaction is more easily controlled, and removal of gaseous hydrogen halide which is formed during the reaction is facilitated. Generally the reaction resulting from each addition of halogen-substituted hydrocarbon to the naphthenic acid is complete in 1 hour or less.

The reactive contact can be conducted in accordance with any of the procedures known in the art for intimately contacting two liquids. Means should be provided for withdrawing vapors from the reaction mixture. These vapors will comprise hydrogen halide which is formed during the reaction and the vapor may also contain halogen-substituted reactant which is vaporized at the reaction condition. The halogen-substituted hydrocarbon reactant is condensed and returned to the reaction mixture, while the hydrogen halide is continuously removed as it is formed. At the completion of the reaction, unreacted halogen-substituted hydrocarbon as well as any hydrogen halide dissolved in the reaction mixture is stripped from the reaction mixture by heating under vacuum. The reaction mixture is then preferably vacuum distilled and product distillate naphthenic acid fractions of light and stable color are obtained. The high boiling resinous products formed during the reactive contact of this invention remain in the distillation residue. Alternatively other physical separation means, e. g. filtration with adsorptive clay, can be employed to separate refined naphthenic acids from the resinous reaction products.

The following examples illustrate the invention:

*Example I*

Substantially completely deoiled naphthenic acids were treated with carbon tetrachloride in accordance with this invention. Two 5% by weight increments of carbon tetrachloride were added to the naphthenic acids. About an hour was allowed between the carbon tetrachloride additions to allow the first reaction to go to completion. The reaction mixture was maintained at 392° F. to 410° F. and constantly agitated. HCl was evolved during the reaction and was continually removed from the reaction mixture. Vaporized carbon tetrachloride was condensed and refluxed to the reactor. After the reaction following the addition of the second carbon tetrachloride increment was complete, unreacted carbon tetrachloride and HCl were stripped from the reaction mixture under vacuum. The stripped mixture was then distilled under vacuum and a distillate fraction comprising 67.5% of the original charge was collected. This distillate naphthenic acid fraction was aged at elevated temperature. The following table shows the tests obtained on the distillate naphthenic acids obtained through practice of the invention compared to tests on a similar distillate fraction obtained from the same charge material which had not been treated by the invention.

|  | Distillate Fraction Treated by this Invention | Distillate Fraction Not Treated by this Invention |
| --- | --- | --- |
| Sap. No | 184 | 191 |
| Acid No | 180 | 182 |
| Viscosity, SUS/210° F | 105.4 | 106.2 |
| Initial Color, NPA | 2 | 3− |
| NPA Color after 24 days @ 150° F | 4½ | 8 |

The distillate fraction obtained according to the invention darkened from 2 to 4½ NPA after 24 days at 150° F. A similar fraction not treated by the invention darkened from 3− to 8 NPA during the same period at the same conditions. Thus the treatment of the present invention substantially improved the color stability of the naphthenic acids.

*Example II*

Naphthenic acids containing about 7% oil were treated with two 5% increments of carbon tetrachloride in the same manner and under similar conditions as described in Example I. The treated acids were vacuum distilled and an 81% distillate fraction was collected. Tests on this distillate fraction are shown in the following table and are compared with tests on an 81% distillate fraction of the same charge material which had not been treated by the invention.

|  | Distillate Fraction Treated by this Invention | Distillate Fraction Not Treated by this Invention |
| --- | --- | --- |
| Sap. No | 166 | 166 |
| Acid No | 160 | 165 |
| Viscosity, SUS/210° F | 325 | 123 |
| Initial Color, NPA | 2½ | 2− |
| NPA Color after 24 hours @ 150° F | | black |
| NPA Color after 400 hours @ 150° F | 8+ | |

The distillate naphthenic acids obtained through treatment according to the invention darkened from 2½ to 8+ NPA in 400 hours at 150° F. Similar non-treated naphthenic acids darkened from 2− NPA to black in 24 hours at 150° F. Practice of the present invention, therefore, greatly improved the color stability of the treated naphthenic acids.

*Example III*

A sample of naphthenic acids was divided into three portions. The first and second portions were treated respectively with 5% of chloroform and ethylene dichloride under conditions similar to those described in Example I. The third portion was not treated with halogen-substituted hydrocarbon. All three portions were vacuum distilled, and 0 to 70% distillate fractions were collected. These distillate fractions were similarly aged at 150° F. The following table shows the results obtained.

|  | Chloroform Treated Portion | Ethylene Dichloride Treated Portion | Portion Not Treated with Halogen-substituted Hydrocarbon |
| --- | --- | --- | --- |
| Sap. No | 199.3 | 179.0 | 183.9 |
| Acid No | 169.3 | 176.9 | 166.9 |
| Viscosity, SUS/210° F | 115.8 | 115.8 | 115.8 |
| Initial Color, NPA | 2½ | 2½ | 3 |
| NPA Color after 27 hours @ 150° F | 4 | 5 | 7 |
| NPA Color after 99 hours @ 150° F | 7 | 8+ | black |
| NPA Color after 123 hours @ 150° F | 8 | black | |
| NPA Color after 195 hours @ 150° F | 8+ | | |

Both naphthenic acid distillates treated with halogen-substituted hydrocarbon showed better color stability than the naphthenic acid distillate not so treated. The chloroform treated naphthenic acids had somewhat better stability than the naphthenic acids treated with ethylene dichloride.

The invention claimed is:

1. The method of producing naphthenic acids of improved color stability which comprises: contacting naphthenic acids with a halogen-substituted hydrocarbon at temperatures in the range of about 250° F. to 550° F., and separating naphthenic acids of improved color stability from products formed during the reactive contact.

2. The method according to claim 1 wherein said halogen-substituted hydrocarbon is a chlorine-substituted hydrocarbon.

3. The method according to claim 1 wherein said halogen-substituted hydrocarbon is carbon tetrachloride.

4. The method according to claim 1 wherein said halogen-substituted hydrocarbon is chloroform.

5. The method according to claim 1 wherein said halogen-substituted hydrocarbon is ethylene dichloride.

6. The method according to claim 1 wherein the naphthenic acids are contacted with a halogen substituted hydrocarbon at temperatures in the range of 350° F. to 450° F.

7. The method of producing naphthenic acids of improved color stability which comprises: contacting naphthenic acids with a chlorine-substituted hydrocarbon at temperatures of 250° F. to 550° F., and separating by vacuum distillation naphthenic acids of improved color stability from products formed during the reactive contact.

8. The method according to claim 7 wherein the naphthenic acids are contacted with a chlorine-substituted hydrocarbon at temperatures of 350° F. to 450° F.

9. The method according to claim 7 wherein said chlorine-substituted hydrocarbon is carbon tetrachloride.

10. The method according to claim 7 wherein said chlorine-substituted hydrocarbon is chloroform.

11. The method according to claim 7 wherein said chlorine-substituted hydrocarbon is ethylene dichloride.

References Cited in the file of this patent

UNITED STATES PATENTS

| 2,200,711 | Berry | May 14, 1940 |
| 2,301,528 | Ewing | Nov. 10, 1942 |
| 2,716,661 | McAteer | Aug. 30, 1955 |